Figure 1:
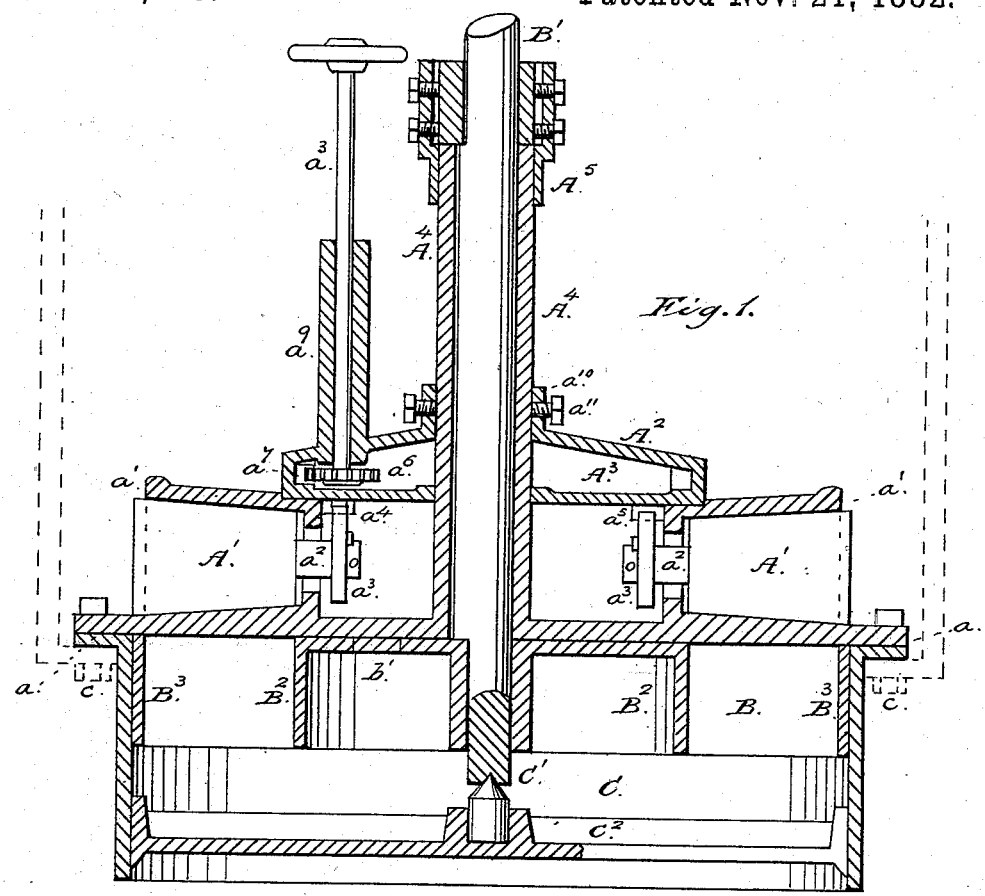

(No Model.) 4 Sheets—Sheet 1.

J. COMLY.
WATER WHEEL.

No. 267,673. Patented Nov. 21, 1882.

Witnesses
Inv. M. McKnight
W. W. Power

Inventor,
Joshua Comly
by his atty
B. C. Pole (No Model.)　　　　　　　　　　　J. COMLY.　　　　　　　　4 Sheets—Sheet 2.
WATER WHEEL.
No. 267,673.　　　　　　　　　　　　　　　Patented Nov. 21, 1882.

(No Model.)  4 Sheets—Sheet 3.
J. COMLY.
WATER WHEEL.
No. 267,673.   Patented Nov. 21, 1882.
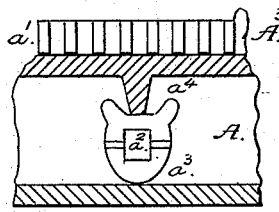
Fig. 4.
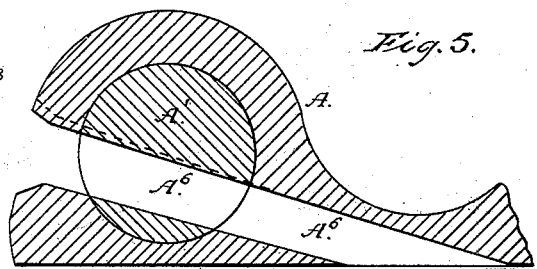
Fig. 5.
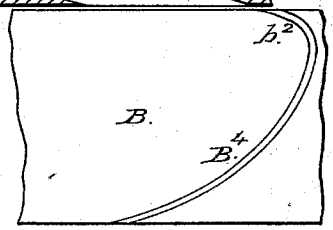
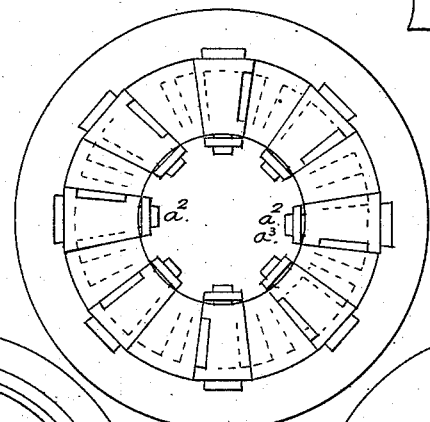
Fig. 6.
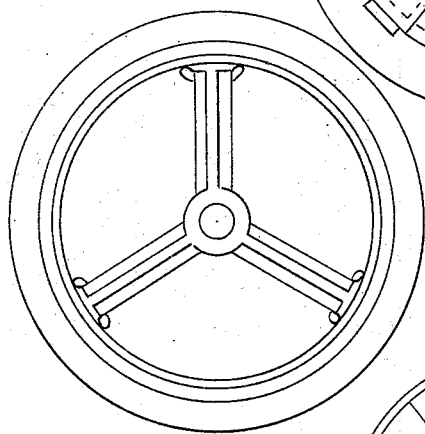
Fig. 7.
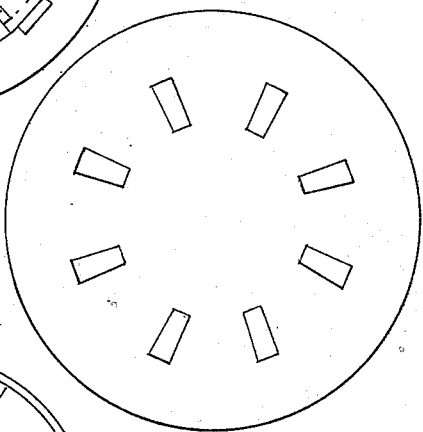
Fig. 8.
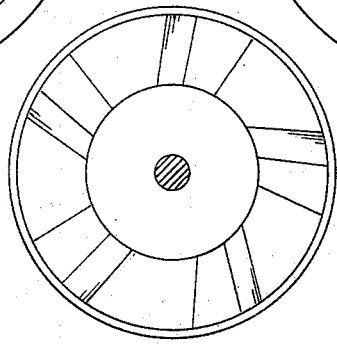
Fig. 9.
Witnesses:
Wm. U. McKnight
W. W. Power
Inventor:
Joshua Comly
by his Atty
B. C. Pole.

(No Model.)  4 Sheets—Sheet 4.

J. COMLY.
WATER WHEEL.

No. 267,673.  Patented Nov. 21, 1882.

Witnesses,
Wm. M. McKnight
W. W. Powen

Inventor,
Joshua Comly
by his Atty
B. C. Pole

UNITED STATES PATENT OFFICE.

JOSHUA COMLY, OF PHILADELPHIA, PENNSYLVANIA.

WATER-WHEEL.

SPECIFICATION forming part of Letters Patent No. 267,673, dated November 21, 1882.

Application filed March 7, 1882. (No model.)

*To all whom it may concern:*

Be it known that I, JOSHUA COMLY, a citizen of the United States, residing at Philadelphia, in the county of Philadelphia and State of Pennsylvania, have invented certain new and useful Improvements in Water-Wheels, (turbines;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to turbine water-wheels, and the nature thereof is in certain constructions hereinafter set forth.

The object of the invention is to cause the water to strike the buckets of the wheel at as near a horizontal line in the direction of its action as is possible; also, in the arrangement of the valves, as shown in the drawings; also, construction by which those valves open in pairs; also, in construction saving the use of a stuffing-box on or to the main shaft; also, construction for lifting the wheel and interior works out of the flume or casing without disturbing the foundations.

Figure 2:
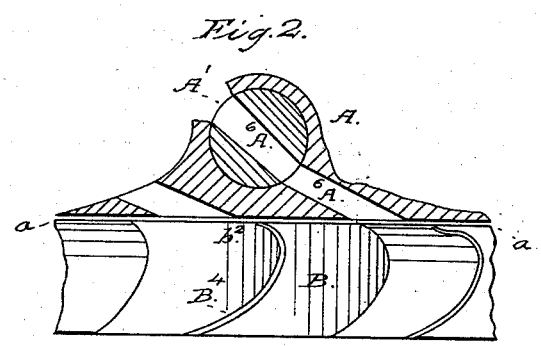
Figure 3:
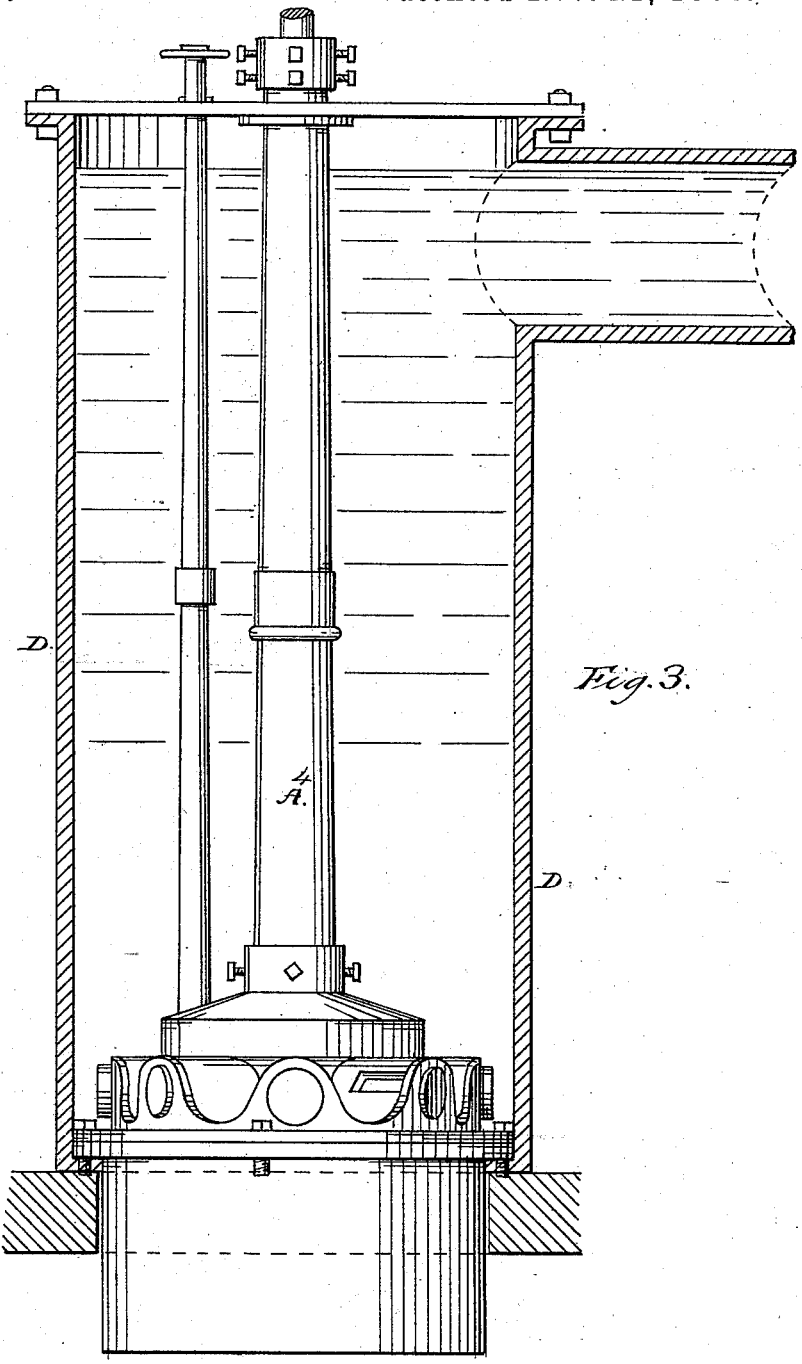
Figure 10:
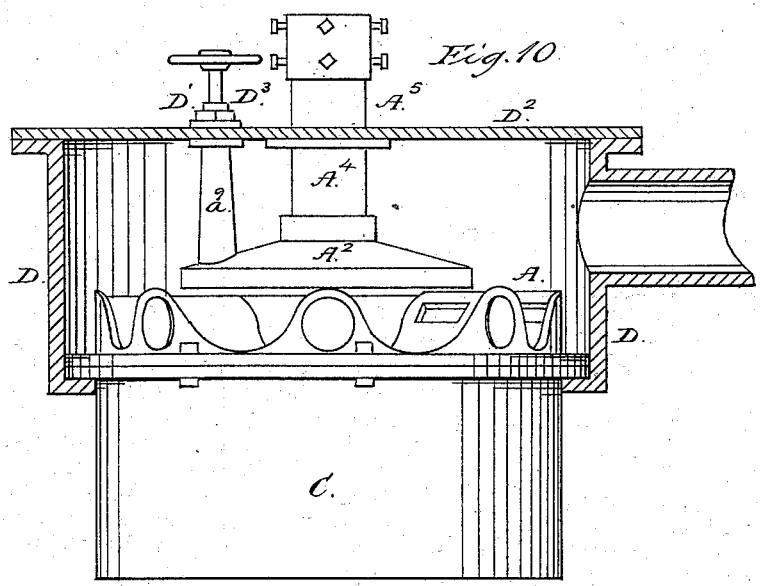
Figure 11:
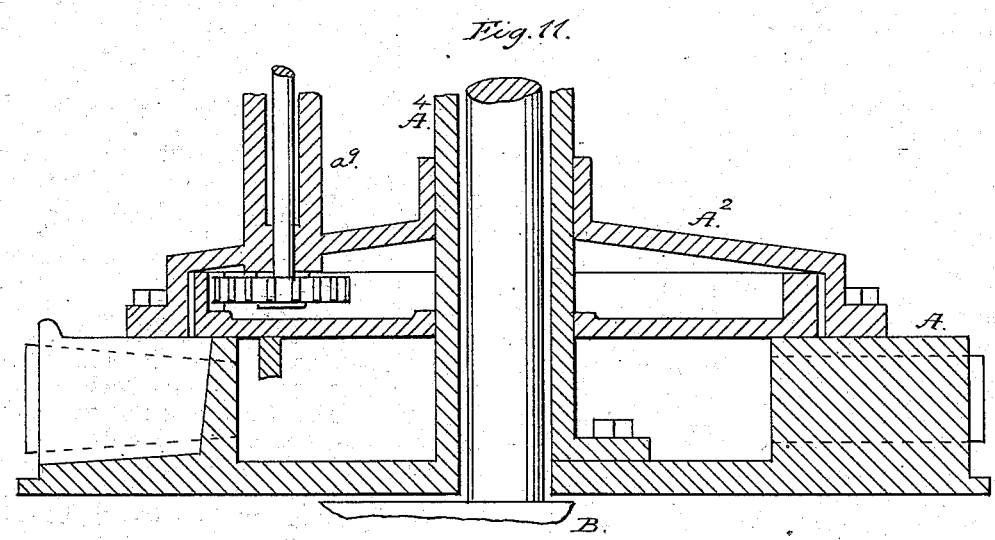
Figure 12:
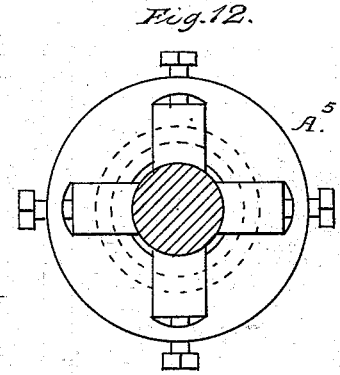

By reference to the drawings and letters of reference marked thereon it will be seen that Figure 1 is a sectional side elevation of my water-wheel. Fig. 2 is a valve-section showing the water-buckets in section. Fig. 3 is a sectional side elevation of my wheel, showing the flume and position of wheel. Fig. 4 is a part sectional elevation of the ratchet-plate which operates the valves, showing the lugs projecting into the jaws of the disk for operating the valves. Fig. 5 is a modification of a valve-section, showing the water-buckets in section. Fig. 6 is a plan of the horizontal valve-plate. Fig. 7 shows the spider-frame of wheel. Fig. 8 is the inverted plan of Fig. 6. Fig. 9 is a plan of the water-wheel. Fig. 10 is a sectional elevation of a modified form of flume adapted to my wheel. Fig. 11 is a part sectional side elevation of a modified construction for holding the pinion-wheel plate. Fig. 12 is a plan of the main shaft-guide.

In all the same letters refer to the same parts.

The water-wheel is divided into three principal parts, A, B, and C. The part A is provided with the horizontal valves A', a cap-plate, $A^2$, and a revolving plate, $A^3$, and has a projecting pipe, $A^4$. The part A is perfectly flat on the under side, and is bolted to the frame C at the flanges $c$. The valves A' are tapering cylinders, regularly fitted into sockets $a'$ of the part A. Said valves A' have the projections $a^2$ on the inside for the purpose of sustaining the disks $a^3$, and as is clearly shown in Fig. 6. These disks $a^3$ are provided to each of the several valves A'. Passed over the sleeve $A^4$ is the revolving plate $A^3$, provided with the lugs $a^4$ and $a^5$. These lugs $a^4$ and $a^5$ are on the under side of plate $A^3$ and engage with the disks $a^3$, and as the plate $A^3$ is revolved by the action of the pinion-wheel $a^6$ by means of teeth $a^7$ the several valves A' are opened or closed by pairs on line opposite each other. The shaft $a^8$ of the pinion-wheel $a^6$ is sustained by the sleeve $a^9$ of the plate $A^2$, and this plate $A^2$ is held in position on the sleeve $A^4$ by the collar $a^{10}$ and set-screws $a^{11}$. At the top of the sleeve $A^4$ is the guide-piece $A^5$, and the sleeve $A^4$ is designed to be carried up through the water above the head of the water-line, thereby saving stuffing-boxes under water-line, and the loss of water consequent upon the leakage of stuffing-boxes. The sleeve $a^9$ is also calculated to be carried up above the water-line, as in the instance of the sleeve $A^4$, and when the head of water is too great to permit the single sleeve passing up to the top the same will be jointed, as shown in Fig. 3. Where the flume D is cased, as shown at D', the guide-piece $A^5$ comes down upon the plate $D^2$ to form the water-joint, and a suitable nut and washer, $D^3$, forms the stop for the sleeve $a^9$. The water-wheel B is provided with the central shaft, B', which rests on the pivot C' of the spider-frame $C^2$, situated at or near the bottom of the casing C. This wheel B is made by a disk, $B^2$, and outer ring, $B^3$. In the disk $B^2$, on the top thereof, are a few small water-openings, $b'$, and this top of the disk $B^2$ corresponds with the under side of the plate A at a parallel therewith on a line as close as practicable. The ring $B^3$ is held in position by the buckets $B^4$. These buckets $B^4$, as shown in Figs. 2, 5, and 9, are arranged so as to receive the full stroke of the water at right angles to its direction, and by the construction $b^2$ a lifting action will be derived from the action of the water passing through the ports $A^6$ in connection with the valve $A'$. In Fig. 2 the valve $A'$ shows the port $A^6$ equally divided on the center-line of valve $A'$, while in Fig. 5, the equivalent construction which I prefer, the port $A^6$ is brought as low down as is possible consistently with strength sufficient to admit of its being properly fitted in.

The operation of the invention is simply that the water which is on top of the wheel B is let diagonally through the plate A upon the buckets $B^4$, and by the acute or oblique angle at which the water strikes the buckets $B^4$, due to this construction, the power of the wheel B is greatly increased.

I may make the valves $A'$ either tapering cylinders, closing in the ends to prevent the water-pressure from locking them in, or I may make them, as shown in Fig. 11, cylinders with parallel diameters; and I further propose to avail myself of the best possible construction for making the passage $A^6$ at as acute angle as possible to bring the line of the direction of the water as low as possible.

Having thus described the construction and operation of my invention, what I claim as mine, and desire to secure by Letters Patent of the United States, is as follows:

1. In a turbine water-wheel, the radial longitudinal valve-plate A, bolted to the frame C, and provided with the horizontal valves $A'$, revolving plate $A^3$, and pinion-wheel $a^6$, substantially as and for the purpose specified.

2. In a turbine water-wheel, the plate A, provided with the horizontal cylinder-valves $A'$, revolving plate $A^3$, cap $A^2$, and elongated tube $A^4$, extending above the water-line, in combination with the casing C, substantially as and for the purpose specified.

3. In a turbine water-wheel, the casing D, bolted to the casing C, and extending above the water-line, in combination with the tube $A^4$, valve-plate A, having horizontal cylinder-valves $A'$, revolving plate $A^3$, and pinion-wheel $a^6$, substantially as and for the purpose specified.

JOSHUA COMLY.

Witnesses:
 BENJ. C. POLE,
 WM. M. MCKNIGHT.